United States Patent [19]

Naarmann et al.

[11] Patent Number: 4,468,291
[45] Date of Patent: Aug. 28, 1984

[54] CONTINUOUS PRODUCTION OF POLYPYRROLE FILMS

[75] Inventors: Herbert Naarmann, Wattenheim; Gernot Köhler; Johannes Schlag, both of Ludwigshafen, all of Fed. Rep. of Germany

[73] Assignee: BASF Aktiengesellschaft, Fed. Rep. of Germany

[21] Appl. No.: 508,144

[22] Filed: Jun. 27, 1983

[30] Foreign Application Priority Data

Jul. 14, 1982 [DE] Fed. Rep. of Germany ....... 3226278

[51] Int. Cl.³ .............................................. C25B 3/02
[52] U.S. Cl. ......................................... 204/13; 204/10; 204/12; 204/59 R; 204/72; 204/78; 204/58.5
[58] Field of Search ................ 204/72, 78, 10, 12, 204/13, 59 R

[56] References Cited

U.S. PATENT DOCUMENTS

| | | | |
|---|---|---|---|
| 1,600,257 | 9/1926 | Topping | 204/13 |
| 1,960,563 | 5/1934 | Wilkins | 204/13 |
| 2,429,902 | 10/1947 | Sternfels | 204/13 |
| 2,433,441 | 12/1947 | Davidoff | 204/13 |
| 3,419,901 | 12/1968 | Nordblom | 204/10 |
| 3,574,072 | 4/1971 | Louvar | 204/72 |
| 3,930,962 | 1/1976 | Cook et al. | 204/13 |

OTHER PUBLICATIONS

A. F. Diaz et al., "Electrochemical Polymerization of Pyrrole", *J.C.S. Chem. Comm.*, (1979), pp. 635–636.
A. F. Diaz et al., "'Organic Metals': Polypyrrole, a Stable Synthetic 'Metallic' Polymer", *J.C.S. Chem. Comm.*, (1979), pp. 854–855.
A. F. Diaz et al., "Electrosynthesis and Study of Conducting Polymeric Films", *Organic Coatings and Plastics Chemistry*, vol. 43, (1980), pp. 774–776.

*Primary Examiner*—R. L. Andrews
*Attorney, Agent, or Firm*—Keil & Weinkauf

[57] ABSTRACT

Polypyrrole films are produced by electrochemical polymerization of a pyrrole, or a mixture of a pyrrole with other comonomers, in an electrolyte solvent in the presence of a conductive salt, by a continuous process wherein the pyrrole polymer is deposited in the form of a film on anodic material which has a sheet-like structure and is passed continuously through the electrolyte solution.

As shown in FIG. 1, this procedure can be carried out in an electrolysis vessel (1) which contains the electrolyte solution (2), a cathode (3) which dips into this solution, and, as the anode, a rotating cylindrical roller (4) which is partially or completely immersed in the electrolyte solution (2); the polypyrrole film (6) is deposited on the anodic surface (5) of the cylindrical roller (4), and is subsequently removed therefrom.

11 Claims, 4 Drawing Figures

CONTINUOUS PRODUCTION OF POLYPYRROLE FILMS

The present invention relates to a process for the production of polypyrrole films by electrochemical polymerization of a pyrrole alone or together with other comonomers in an electrolyte solvent in the presence of a conductive salt, wherein the polymer formed by anodic oxidation is deposited in the form of a film on the sheet-like anode.

The electrochemical polymerization of pyrroles has been disclosed (cf. for example U.S. Pat. No. 3,574,072). According to A. F. Diaz et al., J. Chem. Soc. Chem. Comm. 1979, page 635, J. Chem. Soc. Chem. Comm. 1979, page 854 and ACS Org. Coat. Plast. Chem. 43 (1980), anodic polymerization of pyrrole in the presence of a conductive salt gives films having electrical conductivities of not more than $10^2 \Omega^{-1}$ cm$^{-1}$. These are p-conductive polypyrroles, and the counter-anions are, in particular, $BF_4^-$, $AsF_6^-$, $ClO_4^-$ and $HSO_4^-$.

In the conventional processes for the production of polypyrrole films, the electrochemical polymerization is carried out in a conventional electrolysis cell with or without a diaphragm, in general using noble metal electrodes, in particular platinum electrodes. The polypyrrole formed by anodic oxidation is deposited as a film on the sheet-like anode. A serious disadvantage of this procedure is that the size of the resulting polypyrrole film is limited by the size of the anode surface. For the production of large films, correspondingly large anode surfaces, and hence very expensive apparatuses, are required. Moreover, the batchwise production of relatively large amounts of polypyrrole films is tedious and laborintensive.

It is an object of the present invention to provide a process for the production of polypyrrole films having high electrical conductivity, which process is easy to carry out and permits the production of such films in large amounts and in any desired size, in a simple and economical manner, and wherein a uniform thickness, a smooth surface and homogeneous electrical conductivity over the entire surface of the polymer film are achieved.

We have found that this object is achieved, in accordance with the invention, if the polypyrrole film is produced using a continuously moving anode which continuously provides a fresh surface.

The present invention accordingly relates to a continuous process for the production of polypyrrole films, comprising electrochemically polymerizing a pyrrole, or a mixture of the pyrrole with other comonomers, in an electrolyte solvent in the presence of a conductive salt, wherein the polymer is deposited in the form of a film on anodic material which has a sheet-like structure and is passed continuously through the electrolyte solution.

Special and preferred embodiments of the novel process are described in detail below.

The continuous process according to the invention gives polypyrrole films of any desired size in a simple and economical manner. Even relatively thin polypyrrole films, eg. from 10 to 20 um thick, can be readily removed from the surface of the anodic material directly after production, and can be rolled onto, for example, spindles. In spite of the fact that the anodic material moves, or is passed, continuously through the electrolyte solution, with the result that the distance between cathode and anode may vary and hence give rise to varying current densities during electrolysis and to varying electrolyte concentrations, we have found that the polypyrrole film obtained has a very homogeneous and regular structure and a uniform electrical conductivity over its entire surface.

For the purposes of the present invention, pyrroles are unsubstituted pyrrole itself as well as the substituted pyrroles, such as N-alkylpyrroles, N-arylpyr-roles, pyrroles which are monoalkyl-substituted or dialkyl-substituted at the carbon atoms and pyrroles which are monohalogenated or dihalogenated at the carbon atoms. The pyrroles can be employed alone or mixed with one another. Unsubstituted pyrrole itself is preferably employed for the production of the polymer films. Where substituted pyrroles are employed in the novel process, preferred compounds are the 3,4-dialkylpyrroles, in particular those where alkyl is of 1 to 4 carbon atoms, eg. 3,4-dimethylpyrrole and 3,4-diethylpyrrole, as well as the 3,4-dihalopyrroles, in particular 3,4-dichloropyrrole.

Comonomers which are suitable for use together with the pyrroles in the novel process, in addition to alkynes, eg. acetylene, and polynuclear aromatics, eg. the oligophenylenes, acenaphthene, phenanthrene and tetracene, are, in particular, other 5-membered and/or 6-membered heterocyclic aromatic compounds. These other heteroaromatic compounds preferably contain from 1 to 3 hetero atoms in the ring system, may be substituted at the hetero atoms or at the ring carbon atoms, for example by alkyl groups, in particular of 1 to 6 carbon atoms, and preferably possess two or more unsubstituted ring carbon atoms so that the anodic oxidation can be simply and readily carried out. Examples of heteroaromatic compounds which are very useful comonomers and which can be used either alone or mixed with one another are furan, thiophene, thiazole, oxazole, thiadiazole, imidazole, pyridine, 3,5-dimethylpyridine, pyrazine and 3,5-dimethylpyrazine. Comonomers which have proved to be particularly useful are the 5-membered heteroaromatic compounds, such as furan, thiophene, thiazole and thiadiazole. If, in the novel process, pyrroles are employed together with other comonomers, the weight ratio of the pyrroles to the other comonomers can vary within wide limits, for example from 1:99 to 99:1. Preferably, such comonomer mixtures contain from 20 to 90% by weight of the pyrroles and from 80 to 10% by weight of the other comonomers, the percentages in each case being based on the sum of the pyrroles and the other comonomers.

To produce the polymer films, the monomers, ie. the pyrroles with or without the comonomers, are anodically oxidized and hence polymerized in an electrolyte solvent in the presence of a suitable conductive salt. The monomer concentration is usually about 0.1 mole per liter of solvent, but can deviate substantially from this value. In the continuous process according to the invention, the concentration of the monomers and of the conductive salt in the electrolyte solution gradually decreases if electrolysis is carried out for a sufficiently long time, and, if required, the electrolyte solution may therefore also be replenished, ie. fresh monomers and/or conductive salt can be metered in during the electrolysis. This is most advantageously carried out by circulating the electrolyte solution and metering in the desired amount of the monomers and/or conductive salt outside the actual electrolysis apparatus. It should however be pointed out that, for the novel continuous process and the production of homogeneous regular polymer films, it is not absolutely necessary to keep constant the concentration of monomers and/or conductive salt in the electrolyte solution, so that the novel process can be carried out in a simple closed electrolysis vessel, without circulating the electrolyte solution. This applies in particular to the usual procedure in which the process is interrupted at comparatively low conversions.

Suitable electrolyte solvents for the novel process are the polar organic solvents which are conventionally employed for the electrochemical polymerization of pyrroles and are capable of dissolving the monomers and the conductive salt. Where a water-miscible organic solvent is used, the electrical conductivity can be increased by adding a small amount of water, in general not more than 10% by weight, based on the organic solvent. Examples of preferred organic electrolyte solvents are alcohols, ethers, such as 1,2-dimethoxyethane, dioxane, tetrahydrofuran and methyltetrahydrofuran, acetone, acetonitrile, dimethylformamide, dimethylsulfoxide, methylene chloride, N-methylpyrrolidone and propylene carbonate, as well as mixtures of these solvents; further solvents are polyglycols which are derived from ethylene glycol propylene glycol or tetrahydrofuran, eg. polyethylene glycol, polypropylene glycol, polybutylene glycol or ethylene oxide/propylene oxide copolymers; preferably, these polyglycols possess blocked terminal groups and are hence present as complete polyethers. However, the novel process can also be carried out in an aqueous electrolyte system, as described in, for example, U.S. Pat. No. 3,574,072.

Suitable conductive salts for the novel process are likewise the ionic or ionizable compounds conventionally used for the electrochemical polymerization of pyrroles; particularly suitable compounds are those possessing anions of strong, oxidizing acids or of aromatics which have acidic groups and are unsubstituted or substituted by alkyl and/or nitro groups. Preferred conductive salts contain, as cations, the alkali metal cations, in particular $Li^+$, $Na^+$ or $K^+$, the $NO^+$ or $NO_2^+$ cations, or onium cations, especially those of nitrogen or of phosphorus, for example those of the $R_4N^+$ or $R_4P^+$ type, wherein the radicals R independently of one another are each hydrogen, lower alkyl, preferably of 1 to 6 carbon atoms, cycloaliphatic radicals, preferably of 6 to 14 carbon atoms, or aromatic radicals, preferably of 6 to 14 carbon atoms. Examples of such onium cations are the tetramethylammonium, the tetraethylammonium, the tri-n-butylammonium, the tetra-n-butylammonium, the triphenylphosphonium and the tri-n-butylphosphonium cation. $BF_4^-$, $AsF_4^-$, $AsF_6^-$, $SbF_6^-$, $SbCl_6^-$, $PF_6^-$, $ClO_4^-$, $HSO_4^-$ and $SO_4^{2-}$ have proved particularly advantageous anions for the conductive salts. In another group of conductive salts, which are particularly advantageously employed in the novel process, the anions are derived from aromatics possessing acidic groups. These include, in addition to the $C_6H_5COO^-$ anion, in particular the anions of unsubstituted or alkyl-substituted aromatic sulfonic acids. Particularly preferred conductive salts are those containing the benzenesulfonate or tosylate anion. In another very advantageous embodiment, the aromatics possessing acidic groups may be further substituted by nitro groups. The conductive salts based on the acidic nitroaromatics include, for example, the salts of nitrophenols, of nitro-substituted aromatic carboxylic acids and of nitro-substituted aromatic sulfonic acids. The salts of nitro-, dinitro- and trinitrophenols, nitro-, dinitro- and trinitrobenzoic acids and nitro-, dinitro- and trinitrobenzenesulfonic acids are particularly useful.

In the novel process, the concentration of the conductive salt is in general from 0.001 to 1, preferably from 0.01 to 0.1, mole per liter.

The process according to the invention can be carried out in an electrolysis cell or electrolysis apparatus which may or may not contain a diaphragm and possesses a cathode, an anode and an external d.c. current source. The essential feature of the invention is that the electrochemical polymerization is carried out continuously by means of a movable anode by a method wherein sheet-like anodic material is passed continuously through the electrolyte solution. As a result, exposed anodic material for deposition of the polymer film is always available in the electrolyte solution.

This can be realized, in a simple and very advantageous embodiment of the invention, by a method wherein the anodic material is applied onto the surface of a cylinder, or constitutes the surface of this cylinder, and the cylinder rotates in the electrolyte solution during electrolysis. For the purposes of the invention, the cylinder is either a cylindrical roller or simply a cylindrical jacket, ie. a hollow cylinder. Instead of the cylinder, an endless belt which runs around rollers and contains the anodic material on its surface is equally suitable and advantageous. The cylinder or the endless belt is passed through the electrolyte solution at a velocity such that, under the particular electrolysis conditions, a polymer film of the desired thickness is deposited on the anodic material. The resulting polymer film is then removed continuously from the surface of the cylinder rotating through the electrolyte solution, or from that of the endless belt transported through this solution, and, if required, is washed with a solvent to remove adhering conductive salt and then dried, after which it can be rolled up.

In this embodiment of the novel process, the cylinder, or the endless band running around rollers, can be completely immersed in the electrolyte solution. In this case, the resulting polymer film has to be detached and removed from the surface of the anodic material in the electrolyte solution; this is advantageously carried out using a suitable detaching device, for example a scraper, a stripper blade or a synchronized pressure-sensitive adhesive film coated on one side or on both sides. In general, however, it is simpler and more advantageous if the rotating cylinder or the endless belt is only partially immersed in the electrolyte solution, so that the polymer film deposited on the anodic material in the electrolyte solution is transported out of this solution, and detachment and removal of the film from the surface of the cylinder or of the endless belt can be effected outside the electrolyte solution, with or without the aid of a suitable detaching device as described above. Thereafter, the anodic material having an exposed, uncoated surface is once again drawn into the electrolyte solution. This lastmentioned procedure, in which the rotating cylinder or the endless belt is only partially immersed in the electrolyte solution, has substantial advantages in respect of handling and in particular in the removal of the polymer film from the anodic material.

In another embodiment of the novel process, the anodic material in the form of a finite belt, for example on a spindle located outside the electrolyte solution, can be drawn into the electrolyte solution, and transported through the solution and then out of it again. In this case, too, the anodic material is transported through the electrolyte solution at a velocity which, under the particular electrolysis conditions, permits deposition of a polymer film of the desired thickness on the anodic material.

This embodiment of the novel process permits the deposited polymer film to be detached from the anodic material, but this operation is not necessary. It is therefore particularly preferable to use the anodic material in the form of a finite belt whenever the resulting polymer film is to remain on the anodic material. This may be desirable, for example, for special end uses, for example the production of special electrode materials. This embodiment furthermore offers the possibility of employing various types of anodic material in the novel process in a simple and convenient manner; these materials can then also serve as substrates for the resulting polymer film. As mentioned above, where the anodic material is used in the form of a finite belt, it is advantageous to draw this material into the electrolyte solution from outside and to transport it out of this solution again after the electrochemical polymerization.

In the novel process, the anodic material may be present in segmented form, ie. in the form of discrete sections and surfaces which are applied onto a suitable base, for example a cylinder jacket, the surface of an endless belt running around rollers or the surface of a finite belt. In this case, individual polymer films which are the size of the discrete, segmented surfaces of the anodic material are obtained by a continuous procedure. When such segmented anodic material is used, it can be transported on the base through the electrolyte solution not only by a completely continuous procedure but also in consecutive sections by a method in which one or more segmented surfaces of the anodic material are introduced into the electrolyte solution by transporting the base, electrochemical polymerization with deposition of the polymer film onto the segmented surfaces is carried out without the base being transported further, and the polymer-coated segmented surfaces are then conveyed out of the electrolyte solution by transporting the base, while at the same time one or more fresh uncoated segmented surfaces of the anodic material are introduced into the electrolyte solution.

In general, however, the novel process is carried out using anodic material in the form of a continuous belt. Examples of this include the surface of a cylinder which constitutes the anodic material or possesses a continuous coating of the latter, and an endless belt running around rollers, or a finite belt, whose entire surface constitutes the anodic material. In this case, the anodic material is usually transported through the electrolyte solution in a completely continuous manner, ie. even during electrolysis and polymer deposition. This method gives a cohesive polymer film of any desired length, which can be either rolled up or cut to the appropriate and desired size for its intended use. In this manner, it is possible to produce very long polypyrrole films, belts or strips which have very high electrical conductivity.

In principle, any desired conventional electrode material can be employed as the anodic material in the novel process. Where the anodic material constitutes the surface of a cylinder or of an endless belt, it must be of a nature such that the resulting polymer film can be detached from it without difficulty. Particularly suitable anodic materials are metals, eg. platinum, molybdenum, tungsten and stainless steels, preferably nickel or titanium, and it is advantageous for the surface of the anodic material to be very smooth. Where the anodic material constitutes the surface of a finite belt which is drawn into the electrolyte solution, for example from a spindle, it can comprise, in addition to one of the above metals, materials on which the resulting polymer film adheres firmly, so that it can be detached from the anodic material only with great difficulty, if at all. This is the case, for example, where the anodic material used is an electrically conductive polymer, eg. a p-conductive polyacetylene or a p-conductive polyphenylene. The electrically conductive polymers can be used directly in the form of a film, or can be applied onto a base in a suitable manner. The pyrroles and any comonomers present are polymerized onto the electrically conductive polymers used as the anodic material, chemical bonds being formed. Using this method, it is possible to produce, in any desired length and size, copolymer films which have a layer structure and high electrical conductivity.

Where the resulting polymer film is to be detached from the anodic material, for example when a rotating cylinder or an endless belt running around rollers is used, it has proved very advantageous if the long edges of the anodic material are coated, on the surface, with an electrically insulating material. Examples of substances suitable for this coating are polymers, such as polyethylene, polypropylene, polystyrene and in particular polytetrafluoroethylene and the like. Coating the edges in this manner facilitates detachment of the polymer film from the anodic material, since deposition of the polymer on this material occurs only between the coated edges, with the result that no problems arise at these edges when the polymer film is detached. Similarly, where an endless belt is employed, it is advisable for the back of the belt, ie. the surface which runs over the transport rollers, to consist of an electrically insulating material or to be coated with such a material, so that the polymer can be deposited only on the outer surface of the endless belt. The same of course also applies when using a rotating cylinder or cylinder jacket which is of a form such that only the outer surface of the cylinder jacket constitutes the anodic material. Where a finite belt is used as the anodic material, electrolytic coating with the polypyrrole film can be effected on one side or one both sides, depending on whether only one surface or both surfaces comprise anodic material; preferably, only the surface facing the cathode is anodic, while the reverse surface is composed of electrically insulating material.

BRIEF DESCRIPTION OF THE DRAWINGS

Some of the possible embodiments of the transported anode for the novel continuous process are shown diagrammatically in FIGS. 1 to 4.

DETAILED DESCRIPTION OF THE DRAWINGS

Figure 1:
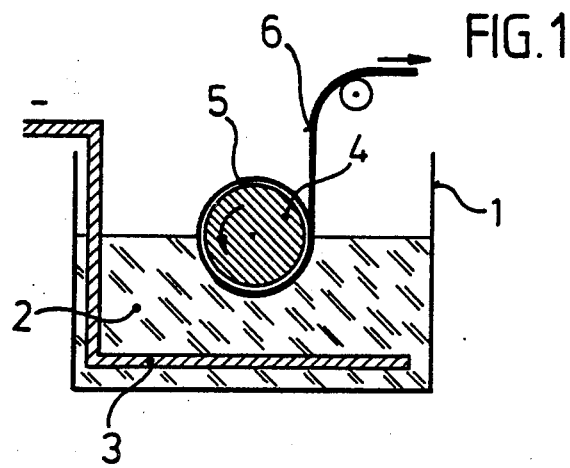

FIG. 1 shows an electrolysis apparatus with a rotating cylindrical anode.

Figure 2:
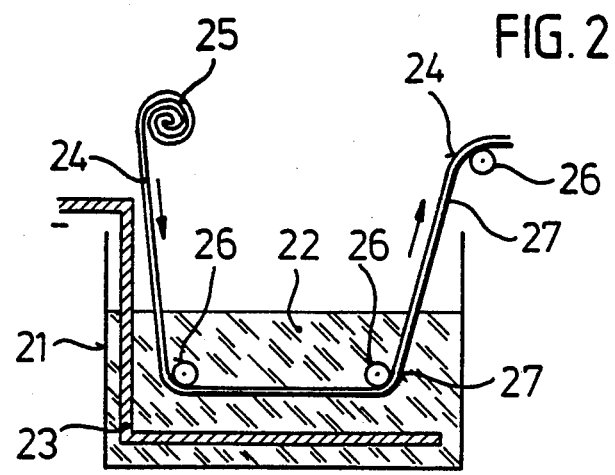

FIG. 2 shows an electrolysis apparatus in which a finite belt is used as the moving anode.

Figure 3:
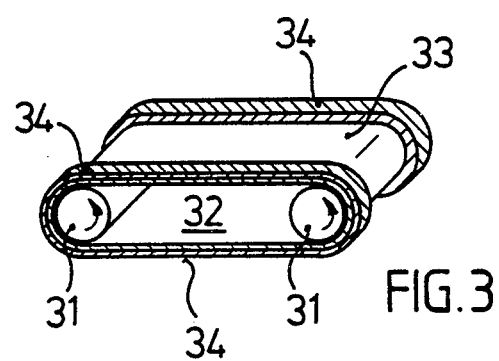

FIG. 3 shows an anode in the form of an endless belt running around rollers.

Figure 4:
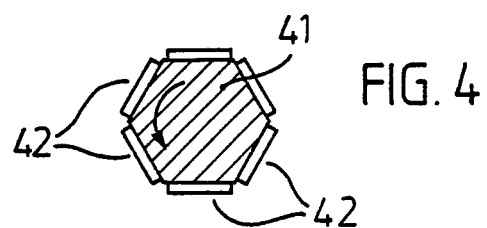

FIG. 4 is an example of an anode in which the anodic material is in the form of discrete segmented surfaces. The figures are described in detail below.

The apparatus shown diagrammatically in FIG. 1 is a simple electrolysis vessel (1) which contains the electrolyte solution (2) comprising the monomers, the conductive salt and the electrolyte solvent, and a cathode (3) dipping into this solution. The anode is a rotating cylindrical roller (4), about half of which is immersed in the electrolyte solution (2). The surface layer (5) of roller (4) constitutes the anodic material and is preferably composed of polished nickel. Current can be supplied to and conducted away from the anode in any desired suitable manner, but this is not shown in FIG. 1. During electrolysis, roller (4) rotates slowly through the electrolyte solution (2), and the polymer formed (6) is deposited as a film on the anodic material (5) and, preferably after it emerges from the electrolyte solution (2), can be removed as a continuous film from the surface (5) of roller (4).

The novel process where a finite belt is used as the anodic material is shown diagrammatically in FIG. 2. The electrolysis vessel (21) contains the electrolyte solution (22) comprising the monomers, the conductive salt and the electrolyte solvent, the cathode (23) dipping into this solution. The anodic material (24), whose reverse side is composed of an electrically insulating material, for example a polytetrafluoroethylene coating, runs continuously from the spindle (25) into the electrolyte solution (22), and is transported through this solution via guide rollers (26) and emerges again from this solution. Current is supplied to and conducted away from the anode in any desired manner, but this is not shown in FIG. 2. During electrolysis, the polymer formed (27) is deposited on the surface of the anodic material (24) and, after emerging from the electrolyte solution (22), can be left on this material or removed from it.

FIG. 3 shows an endless belt which can be employed, for example instead of the cylindrical roller in FIG. 1, as the anode. The endless belt (32) runs around two rollers (31), and its surface (33) constitutes the anodic material. The long edges of the endless belt (32) are provided, on the sides as well as on the surfaces, with borders (34) composed of electrically insulating material, which prevent deposition of the polymer in these areas. This ensures that the resulting polymer film can be readily removed from the anodic surface (33) of the endless belt (32).

FIG. 4 shows a preferred embodiment of an anode comprising discrete, segmented surfaces of anodic material. The base is a polygonal roller (41) with a number of surfaces, the sides of the roller being, for example, hexagonal. The anodic material (42) is applied as a layer onto the individual surfaces of the roller (41), so that the material on a particular surface of the roller is separate from that on any other surface of the roller, hence forming a discrete anode segment.

The nature and form of the cathode is not critical for the novel continuous process. The cathode may be of any suitable electrically conductive material, eg. graphite, but is preferably composed of a metal, eg. platinum, stainless steel or, in particular, polished nickel. It is advantageously sheet-like, for example in the form of a plate, a foil or a film. Cathodes of one of the above metals in the form of a lattice or net have proved particularly suitable. The cathode is preferably arranged parallel to the anodic material transported through the electrolyte solution, ie. at a constant distance from this material. However, this is not a stringent requirement. We have found, surprisingly, that for example when a rotating cylindrical roller is used as the anode, as shown in FIG. 1, it is by all means possible to use a flat cathode, resulting in very variable distances between cathode and anode. In spite of this, electrolysis gives a very homogeneous polymer film of uniform thickness. However, when a cylindrical roller is used as the anode, it is equally possible to adapt the sheet-like cathode to the shape of the anode, so that the distance between the cathodic and the anodic material is the same everywhere.

In addition to a simple electrolysis apparatus comprising an electrolysis vessel for the electrolyte solution, and a cathode and anode of the type described, it is also possible to carry out the novel process using an electrolysis apparatus possessing other equipment, for example an apparatus containing a diaphragm between the anode and the cathode, or one with reference electrodes for the precise determination of the potential. To monitor the thickness of the deposited film, it is advantageous to measure the amount of current (Asec.) or the current density $(A/cm^2)$.

The temperature at which the novel process is carried out was found not to be critical, so that it can be varied within a substantial range provided that it does not fall below the solidification point, or exceed the boiling point, of the electrolyte solvent. In general, a reaction temperature of from $-40°$ to $+40°$ C. has proved very advantageous, but the reaction is usually carried out at room temperature. Although it is not necessary, it may however be advantageous to carry out the electrolysis under an inert gas. The electrolyte solution can be stirred during electrolysis. It has proved advantageous to circulate the electrolyte solution, and a defined reaction temperature can be achieved via a thermostat.

Otherwise, the novel process can be carried out using electrolysis conditions conventionally employed for the electrochemical polymerization of pyrroles. Advantageously, the voltage during electrolysis is from about 1 to 50, preferably from 2 to 20, volt. A current density of from 0.5 to 100, preferably from 1 to 50, $mA/cm^2$, has proved particularly advantageous.

The novel process gives self-supporting films of various thicknesses. In general, the film obtained is from 10 to 100 um thick. The film thickness can be varied and set by means of the residence time of the anodic material in the electrolyte solution, and particularly via the current density. To remove adhering conductive salt, the resulting polypyrrole films can be washed with a solvent, and dried at from 30° to 150° C., preferably under reduced pressure. The films can then be processed further in any desired form, and have very diverse uses.

The polypyrrole films produced according to the invention are highly electrically conductive systems, some or all of which contain the anion of the conductive salt used in their preparation. These polymers may therefore also be regarded as complexes of polypyrrole cations with counter-anions. The electrical conductivity of the polypyrroles is in general from 1 to $10^2 \Omega^{-1} cm^{-1}$, measured by the two-point or four-point method. In respect of other properties, too, the polypyrrole films produced by the novel continuous process are similar to the products obtained by the conventional electrochemical processes. Like the conventional products, they are used in the production of electrodes, catalysts, electrical storage systems, batteries, switches, semi-conductor components, shielding materials, solar cells, etc., and for the antistatic treatment of plastics.

In the Examples which follow, and illustrate the invention, parts and percentages are by weight, unless stated otherwise.

EXAMPLE 1

The procedure was carried out in an electrolysis apparatus as shown diagrammatically in FIG. 1. The electrolysis vessel (1) was composed of glass, and contained an electrolyte solution (2) comprising 3,200 ml of acetonitrile, 15 g of pyrrole and 25 g of tri-n-butylammonium benzenesulfonate. The cathode used was a 15 cm×10 cm stainless steel lattice, and the rotating cylindrical roller (4) had a diameter of about 20 cm and a 420 cm$^2$ anodic surface (5) of polished nickel. The cathode and the anode were arranged such that about half of the roller (4) was immersed in the electrolyte solution (2), and the minimum distance between the roller and the cathode (3) was 35 mm. Electrolysis was carried out using a current density of 5 mA/cm$^2$, and the roller rotated at a speed of 2 revolutions per hour. During electrolysis, the electrolyte solution (2) was stirred with a magnetic stirrer. A 65 μm thick polypyrrole film was deposited on the anodic surface (5) of the roller (4); this film was readily removed from the roller (4), outside the electrolyte solution (2), and was wound in a synchronized manner on a roller. Electrolysis was carried out continuously for 24 hours. The resulting polypyrrole film was washed with acetonitrile and dried at 60° C., after which its electrical conductivity was 50Ω$^{-1}$ cm$^{-1}$.

EXAMPLE 2

The procedure described in Example 1 was followed, except that the cylindrical roller was rotated at an increased speed of 4 revolutions per hour. The resulting polypyrrole film was 25 μm thick and had the same electrical conductivity.

EXAMPLE 3

The procedure described in Example 2 was followed, except that in this case electrolysis was carried out using a current density of 20 mA/cm$^2$. The resulting polypyrrole film was about 40 μm thick and had an electrical conductivity of 50Ω$^{-1}$ cm$^{-1}$.

EXAMPLE 4

The procedure described in Example 1, was followed, except that a monomer mixture comprising 7.5 g of pyrrole and 7.5 g of furan was used in this case. The resulting polymer film was 55 μm thick and had high electrical conductivity, high surface gloss and a tensile strength of 55 N/cm$^2$.

We claim:

1. A continuous process for the production of a polypyrrole film, comprising electrochemically polymerizing a pyrrole, or a mixture of a pyrrole with other co-monomers, in an electrolyte solvent in the presence of a conductive salt, wherein the polymer is deposited in the form of a film on anodic material which has a sheet-like structure and is passed continuously through the electrolyte solution.

2. The process of claim 1, wherein the anodic material is in the form of a continuous belt.

3. The process of claim 1, wherein the anodic material is in segmented form.

4. The process of claim 1, wherein the anodic material is drawn continuously into the electrolyte solution, transported through this solution while the polymer film is deposited on the anodic material, and then transported out of the solution again.

5. The process of claim 1, wherein the anodic material constitutes the surface of an endless belt or of a rotating cylinder or cylindrical jacket, from which the resulting polymer film is removed continuously.

6. The process of claim 4, wherein the anodic material, in the form of a belt, is drawn from a spindle, transported through the electrolyte solution and then transported out of this solution again, the resulting polymer film being left on the anodic material or being removed from this material after it has emerged from the electrolyte solution.

7. The process of claim 2, wherein the anodic material is coated on the surface, at the long edges, with an electrically insulating material.

8. The process of claim 1, wherein the cathode employed is in the form of a lattice or net.

9. The process of claim 1, wherein the electrochemical polymerization is carried out using a voltage of from 1 to 50 volt and a current density of from 0.5 to 100 mA/cm.

10. The process of claim 1, wherein the conductive salt used is an ionic or ionizable compound containing an anion from the group consisting of $BF_4^-$, $AsF_4^-$, $AsF_6^-$, $SbF_6^-$, $SbCl_6^-$, $PF_6^-$, $ClO_4^-$, $HSO_4^-$ and $SO_4^{2-}$.

11. The process of claim 1, wherein the conductive salt used is a salt of an unsubstituted or substituted benzenesulfonic acid.

* * * * *